March 5, 1940.    N. A. LAURY ET AL    2,192,816
METHOD AND APPARATUS FOR STARTING AMMONIA BURNERS
Filed Aug. 24, 1937    2 Sheets-Sheet 1
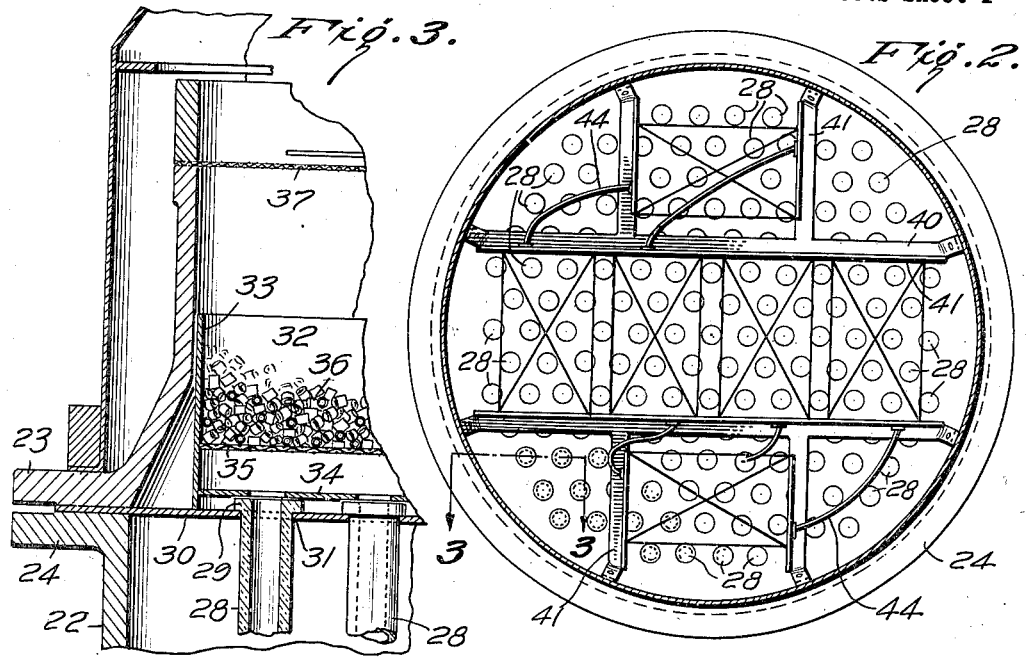
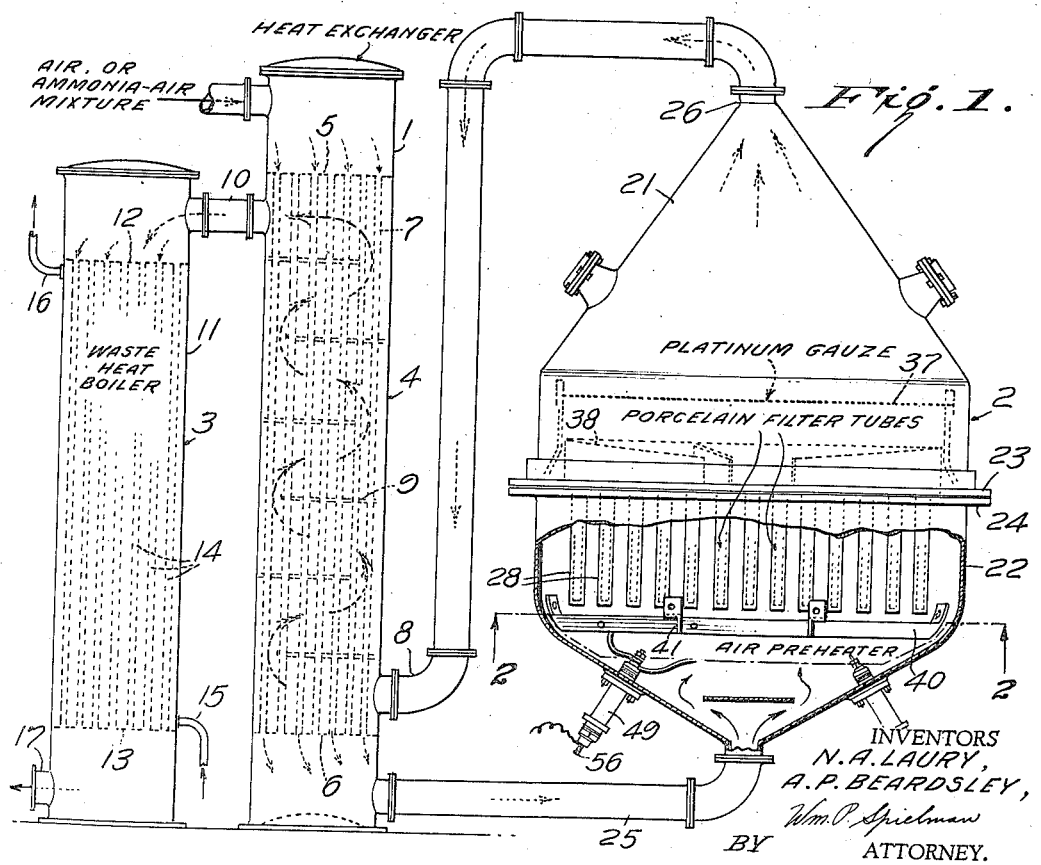
INVENTORS
N. A. LAURY,
A. P. BEARDSLEY,
BY Wm. P. Spielman
ATTORNEY.

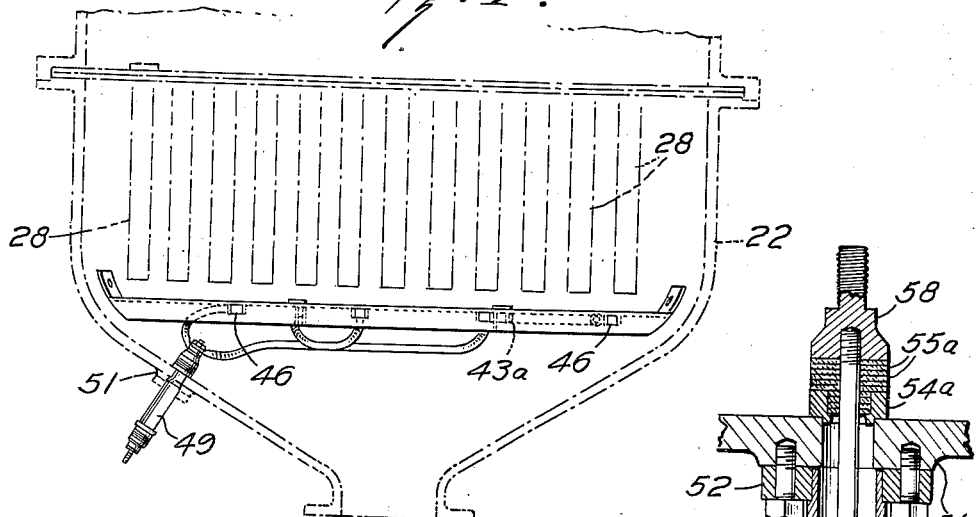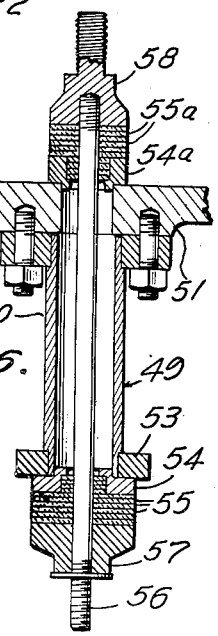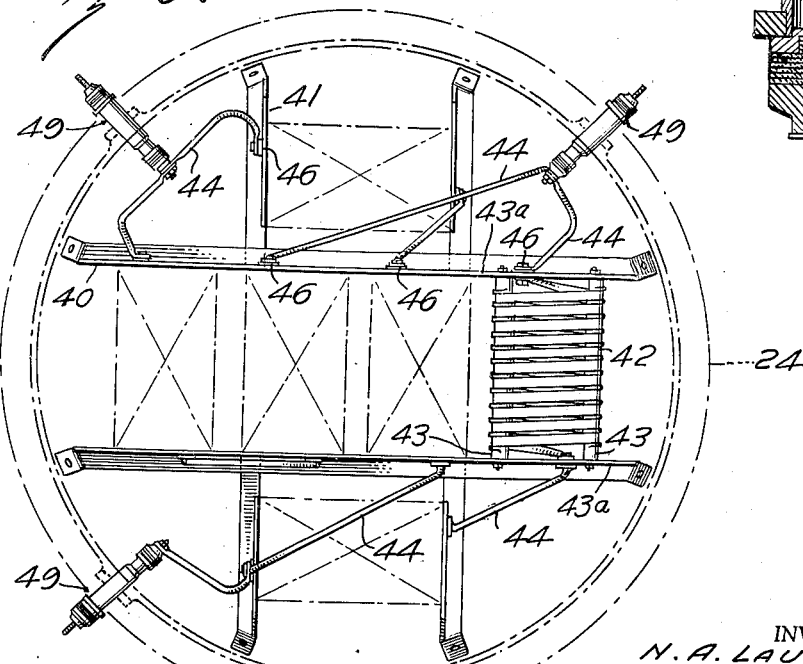

Patented Mar. 5, 1940

2,192,816

UNITED STATES PATENT OFFICE 2,192,816

METHOD AND APPARATUS FOR STARTING AMMONIA BURNERS

Napoleon Arthur Laury, Bound Brook, and Alling Prudden Beardsley, Plainfield, N. J., assignors to American Cyanamid Company, New York, N. Y., a corporation of Maine Application August 24, 1937, Serial No. 160,636

10 Claims. (Cl. 23—162)

This invention relates to a method and apparatus for starting up a nitric acid plant of the type in which oxides of nitrogen are produced by the catalytic oxidation of ammonia. Objects of the invention are the development of a process and apparatus of this nature which will avoid ammonia losses in the initial operating periods and prevent corrosion in the apparatus by the condensation therein of liquids containing oxides of nitrogen.

As is well known, modern nitric acid plants operate upon ammonia as a raw material, and consist of one or more converters or ammonia burners for producing oxides of nitrogen from this material, coolers for lowering the temperature of the gaseous mixtures so produced and for condensing water therefrom, oxidizers for oxidizing the lower oxides of nitrogen to a state in which they are capable of absorption in an aqueous absorbing medium, and an absorption system for accomplishing this result. Most plants also include as standard equipment a preheater in the form of a heat exchanger in which incoming air or an ammonia-air mixture to be oxidized is preheated by heat exchange with gases leaving the burner. A waste heat boiler for recovering additional heat from the gases leaving the burner, and for reducing their temperature, is also usually provided, in order that the temperature of the gas mixture may be lowered to a point where oxidation of the nitric oxide to higher oxides of nitrogen will take place.

In starting up such plants, serious difficulties have been encountered from corrosion of the above described equipment, that is to say, of the ammonia burner, heat exchanger, and waste heat boiler. These pieces of equipment are normally constructed of material subject to corrosion, for they are designed to operate at temperatures far above the dew point of the nitrogen oxide-water mixtures which pass through them when the plant is in normal operation. During the initial period when the plant is starting up, however, they are, of course, cold and condensation of the products of the ammonia oxidation takes place therein.

The customary method of starting up the burners of an ammonia oxidation plant is to create a hot spot on the catalyst gauze by the application of a hydrogen torch, meanwhile turning on the ammonia-air mixture. When this mixture has caught, the torch is removed and the combustion gradually spreads until the entire gauze is lighted, after which the temperature gradually builds up to the range of 800° C. or higher which is most favorable for the production of oxides of nitrogen. It is apparent, however, that during this preliminary period when only a part of the gauze is lighted, as well as during the subsequent period before the converter reaches its proper temperature, considerable quantities of unreacted ammonia pass through the catalyst and into the following apparatus. Moreover, at temperatures lower than the optimum range, much of the products of combustion of the ammonia are nitrogen and water vapor, which are inert and cause loss of yield during the initial period of operation. For all of the above reasons, the starting up of a nitric acid plant is considered as a costly and troublesome procedure, and is frequently avoided wherever possible by keeping the plant in continuous operation even though there is no immediate need for the nitric acid obtained therefrom.

The present invention avoids the above and other difficulties by providing means whereby the entire oxidation and cooling system of the plant may be preheated to temperatures above the dew point of the nitric oxide gases before the ammonia-air mixture is admitted to the system. In accordance therewith, an electric heater is provided in or directly before the ammonia burner, and is mounted in such a position that it cooperates with other elements of the ammonia burner to efficiently preheat a current of air which is passed therethrough. This heated air is then passed through the cooling system of the plant, and serves to preheat the tubes thereof to a temperature at which no condensation of liquids containing oxides of nitrogen will take place.

In addition to its function of preheating and avoiding corrosion in the burner and heat absorbers of the plant, the electric heater of the present invention also serves the additional important function of preheating the catalyst gauze in such a manner that the amount of total combustion of ammonia to nitrogen and water vapor during the starting up period is reduced to a minimum. We have found that the usual catalyst gauzes of platinum or platinum-rhodium of present day ammonia oxidation plants will begin to function at temperatures as low as 270-300° C. when the normal operating mixture of air and ammonia (i. e. an air mixture containing 9% of ammonia) is passed thereover. Of course at the lowest temperature the product of combustion is chiefly nitrogen and water vapor, but with the entire gauze and the whole of the ammonia burner preheated to this temperature, and operating upon a preheated reaction gas mixture, the temperature rises almost immediately to a range where nitric oxide is the main product.

While the invention in its broader aspects is applicable to ammonia burners of any construction, an additional specific feature thereof resides in the combination of an electric heater with an ammonia burner of the type in which refractory filtering elements are interposed in the gas stream ahead of the catalyst gauze. This combination overcomes the well known inefficiency of a heating element consisting of heated wires for heating a stream of air, for only heat that is transmitted by actual contact of the air with the wires can be usefully supplied in this way. Radiant heat, which amounts to at least 50% of the total heat given off by an electric heater, cannot be taken up by a gas, but is transmitted to the cooler walls of the burner and a large proportion of it is lost. Refractory material such as ceramic filtering elements, on the other hand, is capable of acquiring a high temperature by the absorption of radiant heat, and this is transmitted to the gases as sensible heat during their passage through the ceramic material. Accordingly, by positioning the electric heater close to the ceramic filtering elements, the latter are caused to serve the double function of filtering and preheating the incoming air or ammonia-air mixture, and thus the thermal efficiency and rapidity of action of the heater is greatly improved.

The invention will be described in greater detail in conjunction with the accompanying drawings, but it is understood that these are for illustrative purposes only and that the invention in its broader aspects is not limited to the details thereof.

In the drawings:

Fig. 1 is a diagrammatic representation of the heat exchanger, ammonia burner, and waste heat boiler of a nitric acid plant equipped with a preheater in accordance with the present invention.

Fig. 2 is a section on the line 2—2 of Fig. 1, looking in the direction of the arrows, and showing the support for the electric heater and the adjacent filtering elements.

Fig. 3 is an enlarged vertical section on the line 3—3 of Fig. 2 showing the mounting of the filtering elements.

Fig. 4 is an elevation of the supporting grid and bus bars of the electric heater, the converter shell and filter tubes being shown by broken lines.

Fig. 5 is a plan view of the heater, showing the electrical connections and one heating unit in place, and Fig. 6 is a section of the insulated terminal post for conducting current through the converter shell.

Referring to Fig. 1, a portion of a nitric acid plant is shown consisting of a heat exchanger 1 for simultaneously preheating the ammonia-air mixture on its way to the catalyst and cooling the hot nitric oxide gases, an ammonia burner or converter 2 for oxidizing the ammonia to oxides of nitrogen, and a waste heat boiler 3 for further cooling the nitric oxide gases and generating steam for use in driving the fans and pumps of the plant and otherwise furnishing power for the process. The heat exchanger and waste heat boiler are usually constructed in whole or part of soft steel which is capable of corrosion by a mixture of water vapor and oxides of nitrogen at temperatures below its dew point. The heat exchanger consists of a cylindrical shell 4 having top and bottom pieces and containing upper and lower tube sheets 5 and 6 between which are mounted tubes 7 for conducting air or an ammonia-air mixture to the burner. The hot gases leaving the burner enter the spaces between the tubes through inlet pipe 8 and pass through an extended travel by reason of the staggered baffles 9, finally leaving through the pipe 10 and entering the waste heat boiler.

The waste heat boiler is shown diagrammatically as being one of the fire tube type, and consisting of an outer shell 11 with top and bottom pieces, upper and lower tube sheets 12 and 13, tubes 14 extending between these tube sheets in the usual manner and a feed water or steam inlet 15 and steam outlet 16. Gases entering from the heat exchanger through the pipe 10 pass downwardly through the tubes 14 and leave through the exit pipe 17, to be subsequently passed through a water cooler, an oxidizing chamber, and an absorption apparatus during the remaining steps of the process.

The ammonia burner or converter in conjunction with which the heater of the present invention is used is shown as being one of the inverted cone type, although it is apparent that converters of other types may be used if desired. In the modification shown, its outer shell consists of an upper cone 21 and a lower conical member 22, the two sections being preferably of metal or alloy resistant to oxidation and provided with flanges 23 and 24 at their lower and upper edges respectively for convenience in assembling. An inlet pipe 25 leads from the bottom outlet of the heat exchanger to the inlet of the lower cone, while an outlet pipe 26 is provided at the apex of the upper cone for drawing off hot gases from the catalyst and leading them to the inlet pipe 8 of the heat exchanger.

As is shown in Fig. 1, and in greater detail in Fig. 3, the converter is provided with a large number of filter tubes 28, which are molded from ceramic material and are relatively porous. These filter tubes are closed at their bottom ends but at their tops are open and provided with lips 29 for aid in mounting. Between the upper and lower flanges 23 and 24 is inserted a metal sheet 30, similar to a tube sheet, having perforations 31 of a size forming an easy fit with the filter tubes 28. The filter tubes are suspended in this plate and hang by reason of the overhanging lips 29, and serve to filter suspended material from the gases.

A metal basket 32 consisting of a cylindrical wall 33 and a perforated bottom 34 is preferably mounted on the plate 30 in such a manner that the perforations in its bottom are in alignment with the tops of the filter tubes 28. This basket is provided with a screen 35 on which is placed a layer of Raschig rings 36 or other refractory material, which prevents the reflection of radiant heat from the catalyst gauze 37 back into the filter tubes. As is shown in Fig. 1, this basket is preferably provided with radial reinforcing strips 38, which serve to give it added strength and stability under the high temperatures at which the converter is operated.

The converter is shown as being provided with a single layer of platinum gauze 37, although it is apparent that a greater number of gauzes may be employed if desired. This gauze may be of pure platinum or of a platinum-rhodium alloy, or alternatively a layer of a non-metallic catalyst such as a metal oxide may be employed. It is an advantage of the invention that it may be applied to converters using catalysts of any type. However, the platinum gauze type of catalyst can only be heated by direct application of a flame or hot gases at right angles to its plane, as its surface is so great and its heat capacity so small that it will not retain a high temperature for any length of time. For this reason the invention is of particular importance in lighting the gauze type of catalyst.

The electric heater with which the converter is provided in accordance with the present invention may be of any type, but preferably consists of a number of resistance heaters of more or less equivalent heating capacity so that a suitable number may be installed in accordance with the requirements of plants of different sizes. As is shown on Figs. 2 and 4 of the drawings, the units are mounted on a supporting bed 40 consisting of welded angle iron strips 41, these being bolted to the lower converter shell preferably closely adjacent to the bottoms of the filter tubes 28. In the installation shown the heating units themselves are conventional spirally wound resistance strips 42 of Nichrome or other non-oxidizing material, these being wound on porcelain spools 43 which are mounted between the upstanding edges 43a of the angle irons 41 by means of screw threaded rods fitted with nuts at their ends. The several units are electrically connected with each other by connectors or bus bars 44 which are in turn attached to the ends of insulating conductors 49 passing through the converter shell 22 at suitable points. In the installation shown there are three such conductors since the installation is adapted for a three-phase, 220 volt alternating current, and no ground connection is necessary. The bus bars are connected to the Nichrome heating strips at their ends by bolts 46 which are supported in mica insulators mounted in square holes cut in the vertical flanges 43a as best illustrated in Fig. 4. While only a single heater has been shown in detail, it is obvious that the other heaters are simply duplicates of the one shown and will be mounted in the positions illustrated diagrammatically in Fig. 5 by the broken lines.

The insulating conductor 49 which is used to conduct the electrical current into the heaters 42 is illustrated in Fig. 6, and preferably consists of a central tubular member 50 to which is welded or otherwise fitted at its inner end a collar 52 which is bored for the reception of stud bolts for attachment to an apertured boss 51 on the lower converter shell 22. At its outer end the tubular member 50 is provided with a flange 53 which cooperates with a brass collar or packing gland 54, which in turn supports a mica or other insulating packing 55. A collar 54a similar to the collar 54 and adapted to fit the aperture in the boss 51 is provided within the converter shell 22, and supports mica or other insulating packing 55a similar to the packing 55. This assembly is such that a conductor 56 in the form of a bolt screw threaded at its opposite ends may be passed through the tube 50 and securely held at its upper and lower ends by nuts 57 and 58 against the insulating packing 55 and 55a, whereby a gas tight and electrically insulated connection is made between the exterior and the interior of the converter.

In starting up a plant equipped with a preheater in accordance with the present invention, a current of air is blown through the apparatus for several hours before the ammonia-air mixture is admitted. During this time, the electric air preheater is in operation, and serves to preheat the converter to temperatures in the neighborhood of 300–400° C. At the same time, the operation of the heat exchanger serves also to preheat the incoming air by heat exchange with air leaving the converter, thereby conserving heat and making it possible to preheat the two pieces of apparatus with a relatively small heating element. The air leaving the heat exchanger also serves to warm the tubes of the waste heat boiler and this may be aided by introducing steam into the boiler instead of water. The condensation of liquid containing oxides of nitrogen that would take place in this piece of equipment is thus prevented.

After the converter has been preheated to 300° C. or higher the ammonia-air mixture may be turned on in the usual manner of plant operation. At these low temperatures the first products of combustion will, of course, consist mostly of nitrogen and water vapor with only slight traces of nitric oxide. The failure of the converter to produce oxides of nitrogen at these low temperatures is, however, no serious disadvantage, for more heat is generated in the total combustion of ammonia than by its partial oxidation and the temperature of the gauze therefore rises rapidly to the point where efficient conversion of ammonia into oxides of nitrogen ensues.

As soon as the platinum gauze is well lighted, the electric current can be shut off from the air preheater and the plant then functions in its normal manner until it is again to be shut down. The increased ease of starting which results from the present invention overcomes to a great extent the undesirable features of frequent shut downs, and the plant may be started up with a minimum of effort.

While the invention has been described specifically in conjunction with a single installation, it is understood that this description is for illustrative purposes only, and that the invention in its broader scope is limited only by the claims appended hereto.

What we claim is:

1. The method of starting an ammonia oxidation converter having a heat exchanger for preheating the incoming reaction gas mixture by heat exchange with the hot outgoing reacted gases which comprises introducing a stream of air through the heat exchanger into the inlet of the converter, applying heat to the air within the converter at a point within the converter between the gas inlet and the catalyst which is of the gauze type, passing the heated air through the catalyst to heat the same, passing the air from the catalyst through the heat exchanger and thereby preheating additional incoming air, applying additional heat to the preheated air as aforesaid and passing it through the catalyst, and finally substituting for the air an ammonia-air mixture when the catalyst has reached ignition temperatures.

2. A method according to claim 1 in which the catalyst gauze contains platinum and the minimum ignition temperature is 270–300° C.

3. The method of preheating an ammonia oxidation catalyst of the gauze type which comprises applying radiant heat to refractory material, passing air alone in contact with said refractory material to heat the same, and then passing the heated air through the catalyst.

4. The method of preheating an ammonia oxidation system in which the catalyst is of the gauze type which comprises applying radiant heat to refractory material adjacent the catalyst, simultaneously passing air alone through said refractory material and then through the catalyst, and subsequently transmitting heat from the air to other elements of the system.

5. In an ammonia oxidizing system, a converter in which the catalyst is of the gauze type, a heat exchanger for preheating incoming gases passing to said catalyst by heat exchange with gases leaving the catalyst, refractory filtering material mounted in the converter in the path of the gas flow, and a heater capable of giving off radiant heat located within the converter between the catalyst and the heat exchanger, said heater being in heat transferring proximity to said refractory filtering material.

6. A converter for the oxidation of ammonia comprising a converter shell having a gas inlet and a gas outlet, a gauze type catalyst within the converter shell, refractory material in the converter interposed between the catalyst and the gas inlet in the path of the gas flow, and an electric heater adapted for intermittent operation and capable of giving off radiant heat located in the converter in heat transferring proximity to said refractory material.

7. A converter for the oxidation of ammonia comprising a converter shell having a gas inlet, and a gas outlet, a perforated sheet extending across the interior of said converter shell, a catalyst screen mounted in said shell between the perforated sheet and the gas outlet, refractory filtering elements fitted into the perforations of said sheet and extending in the direction of the gas inlet, and a heater adapted for intermittent operation and capable of giving off radiant heat adjacent to said filtering elements.

8. In an ammonia oxidation converter, in combination, a converter shell including upper and lower sections, a perforated sheet supported between said sections and extending across the interior of said converter shell, a catalyst of the platinum screen type in said upper section, a plurality of tubular refractory filtering elements mounted in the perforations of said sheet and extending into said lower section, and an electric heater adapted for intermittent operation adjacent the lower ends of said filtering elements.

9. The method of preheating an ammonia oxidation system including a heat exchanger, a waste heat boiler and a converter containing a gauze type catalyst having refractory material adjacent thereto which comprises applying radiant heat to the refractory material, simultaneously passing air alone through said refractory material and then through the catalyst gauze, and subsequently transmitting heat from the air to the heat exchanger and waste heat boiler.

10. A converter for the oxidation of ammonia comprising a converter shell having a gas inlet and a gas outlet, a catalyst gauze within the converter shell, refractory filtering elements mounted in the converter in the path of the incoming gases between the catalyst and the gas inlet, and a heater adapted for intermittent operation and capable of giving off radiant heat mounted within said converter shell in heat transferring proximity to said refractory filtering elements.

NAPOLEON ARTHUR LAURY.
ALLING PRUDDEN BEARDSLEY.